United States Patent [19]
Otto et al.

[11] Patent Number: 5,305,908
[45] Date of Patent: Apr. 26, 1994

[54] COMPARTMENTALIZED FLUID TANK

[75] Inventors: John E. Otto; Allen C. Bieber, both of Erie; Ronald H. Till, Fairview, all of Pa.

[73] Assignee: General Electric Company, Erie, Pa.

[21] Appl. No.: 1,011

[22] Filed: Jan. 6, 1993

Related U.S. Application Data

[62] Division of Ser. No. 881,925, May 12, 1992, Pat. No. 5,186,352.

[51] Int. Cl.$^5$ ............................................. B65D 1/24
[52] U.S. Cl. ................................. 220/564; 220/501; 220/746
[58] Field of Search .............. 220/564, 501, 502, 562, 220/573, 746, 503, 630

[56] References Cited

U.S. PATENT DOCUMENTS

| | | | |
|---|---|---|---|
| 2,794,569 | 6/1957 | McCuen | 220/564 |
| 4,213,535 | 7/1980 | Ban et al. | 220/501 |
| 4,224,110 | 9/1980 | McCord | 220/501 |
| 4,298,130 | 11/1981 | Ifrach | 220/501 |
| 4,809,860 | 3/1989 | Allen | 220/502 |

FOREIGN PATENT DOCUMENTS 599594  3/1948  United Kingdom ................ 220/564

*Primary Examiner*—Joseph Man-Fu Moy
*Attorney, Agent, or Firm*—R. Thomas Payne; Marvin Snyder

[57] ABSTRACT

A compartmentalized tank divided into a plurality of compartments are fluidly connected to a filling chamber wherein the filling chamber has an overflow fluid passage to each of the plurality of compartments and a fluid channel elevationally below the overflow fluid passage which conducts fluid flow during filling of the compartments but does not conduct fluid flow between the compartments when the tank is improperly oriented. Each of the plurality of compartments may include an orientation restrictive air vent, such as one formed by an elongated air channel positioned to reduce the loss of fluid in the event the tank is tipped on its side. The fluid channel has a plurality of orifices for conducting fluid flow from the filling chamber to the plurality of compartments which prevent fluid loss when a compartment is damaged.

In another embodiment, the tank includes a supply line and a return line in each compartment. The fluid flow in supply lines and return lines may be controlled by a valve to prevent improper siphoning or leakage when the tank is damaged or improperly oriented.

6 Claims, 6 Drawing Sheets

COMPARTMENTALIZED FLUID TANK

This is a division, of application Ser. No. 07/881,925, filed May, 12, 1992 now U.S. Pat. No. 5,186,352.

BACKGROUND OF THE INVENTION

This invention relates generally to tanks for containing fluids, and relates more particularly to fluid tanks, such as vehicular fuel tanks, designed to minimize fluid loss in the event of damage and/or improper orientation.

Present fluid tanks, if punctured or damaged, will typically leak all of the fluid inside the tank to the surrounding environment. Further, if the tanks are tipped on their side or otherwise improperly oriented, loss of fluid may result from flow of fluid out of tank apertures such as breathers or air vents. Such fluid loss may represent substantial health, safety, and environmental hazards particularly where the fluid tank contains large amounts of highly combustible fuel or where the fluid tank contains toxic substances.

For example, punctures or damage to any portion of a vehicular fuel tank may result in the loss of its entire contents, thus endangering the safety of the vehicle passengers, the general public, emergency personnel and/or the environment. Where a fuel tank is not punctured but rather tipped on one of its sides, as may occur when a locomotive derails or a vehicle turns on a side, fuel may escape through tank air vents.

Other problems exist where vehicles or systems require distributed fluid tanks or have multiple fluid tanks which contain the same type of fluid. For example, typical locomotive fuel tanks have one or more filling ports, and have a suction line which provides fuel to the engine, and a return line from the engine which brings the excess, unburned fuel back to the fuel tank. Generally, such distributed or multiple tanks, are connected by fluid channels such that a leak in one tank causes all of the tanks to be drained. Consequently, there exists a need for a fluid tank capable of minimizing fluid loss and having distributed fluid compartments which may be filled simultaneously from one or more fill points.

SUMMARY OF THE INVENTION

It is an object of this invention to provide a fluid tank which minimizes the effect of leaks caused by various types of damage to the fluid tank.

It is a further object of this invention to provide a fluid tank which minimizes the effect of leakage caused by improper orientation of the fluid tank.

It is yet a further object of this invention to provide a fluid tank which minimizes fluid loss while having the feature of filling multiple fluid compartments in a substantially simultaneous manner.

The invention includes a tank divided into a plurality of compartments that are connected by a plurality of fluid paths to a filling chamber. The filling chamber has an overflow fluid passage to each of the plurality of compartments and a fluid channel below the overflow fluid passage. The fluid passage and fluid channel conduct fluid flow to all compartments during filling of the compartments but does not conduct fluid flow between all of the compartments when the tank is improperly oriented. Each of the plurality of compartments may include an air vent to reduce the loss of fluid in the event the tank is tipped on its side, such as one formed by an elongated air channel.

The fluid channel has a plurality of orifices for conducting fluid flow from the filling chamber to the plurality of compartments. One embodiment of the fluid channel includes a partition wall extending substantially the entire longitudinal length of the filling chamber and extending less than the entire transverse width of the filling chamber. The orifices are at distal ends of the filling chamber. The fluid channel may be formed instead or in part by a pipe, or other suitable channel forming device. In accordance with the invention, the greater the number of compartments, the smaller the loss of fluid in the event of localized tank damage.

In another embodiment, the tank includes a supply line and a return line in each compartment. The fluid flow in supply lines and return lines may be controlled by a valve to prevent improper siphoning or leakage when the tank is damaged or improperly oriented.

DESCRIPTION OF THE PREFERRED EMBODIMENTS

The following description will be with reference to a vehicular fuel tank for a locomotive. However, the fundamental advantages of compartmentalization as described herein would provide the same benefits to any fluid tanks regardless of the type of fluid or particular application.

Figure 1:
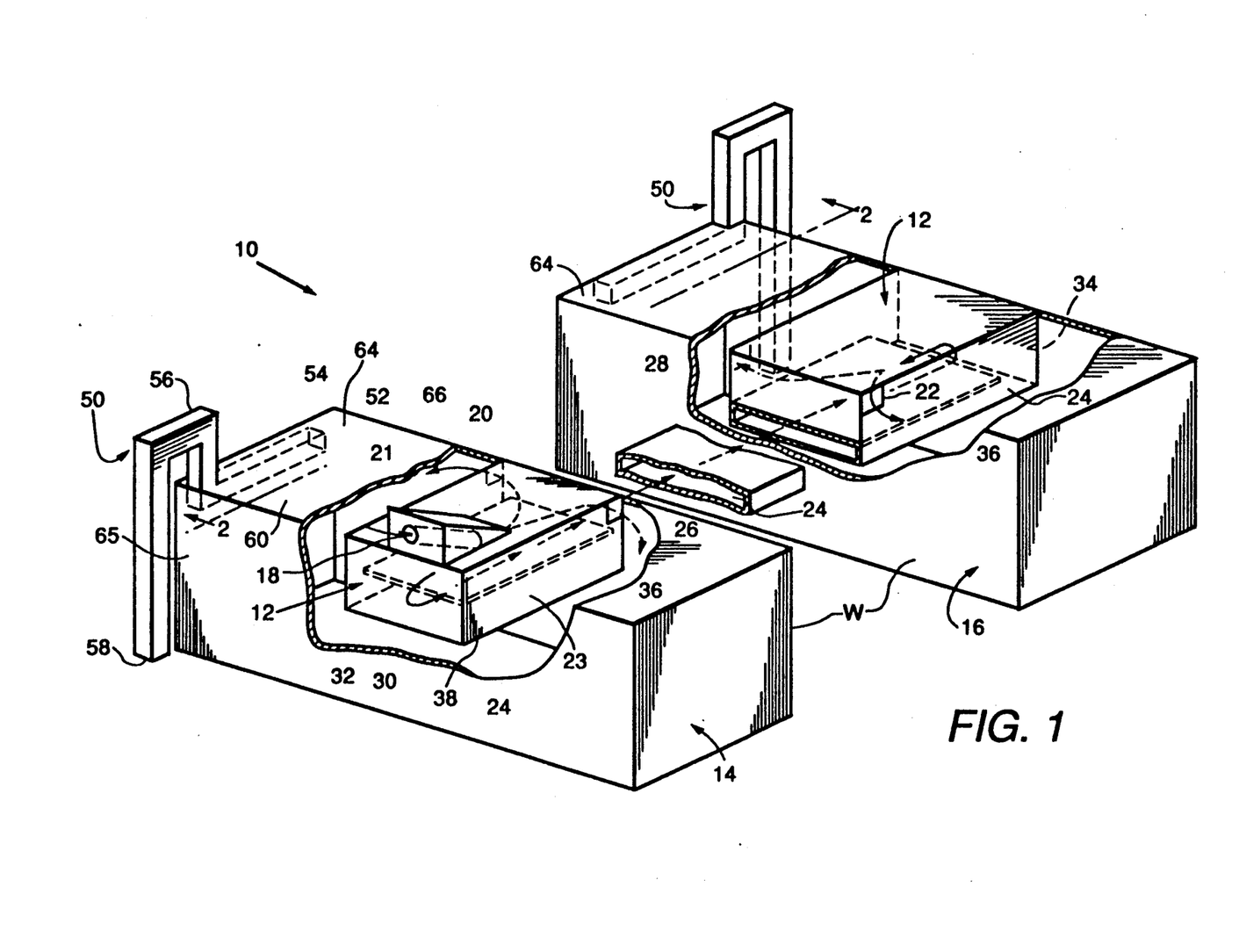
FIG. 1 generally depicts a cut away elevational view of a compartmentalized tank in accordance with the invention.

FIG. 1 shows an embodiment of the present invention in which fluid tank 10 has a filling chamber 12 in fluid connection with a first fluid containment compartment 14 and an opposing second fluid containment compartment 16. Although the fluid compartments 14 and 16 are shown as being opposed, it will be recognized that any suitable relation which complies with the concepts and functions herein described may be used. The filling chamber 12 includes a filling port 18 in fluid connection with a first fluid passage 20 a second fluid passage 22 and a fluid channel 24. The filling chamber 12 may be formed by a plurality of interconnected walls located inside the fluid compartments 14 and 16. For example, the filling chamber may be formed in a box-like configuration having two pairs of interconnected opposing side walls with a pair of opposing end walls connected to marginal edges of the two pair of interconnected side walls.

The first fluid passage 20 may be formed by a filling hole through an end wall 21 of the filling chamber 12 located in the first fluid compartment 14. Similarly, the second fluid passage 22 may be formed by a filling hole through a longitudinally opposed end wall 23 of the filling chamber 12 located in the second fluid compartment 16. Any suitable fluid passage may be used including pipes or the like. While filling holes or apertures are used, the sizes of the filling holes may be changed or additional opposing filling holes may be added to increase the fill rate of the tank as shown by supplemental passages 26 and 28.

The fluid channel 24 is in fluid communication with the first and second fluid passages 20 and 22 as shown by the series of arrows 30 indicating fluid flow during fill up through the fill port 18. The fluid channel 24 includes a first orifice 32 proximate one terminal end of the fluid channel 24 and a second orifice 34 proximate another terminal end of the fluid channel 24. The first orifice 32 lies below and a lateral distance away from the first fluid passage 20 while the second orifice 34 lies below and laterally distant from the second fluid passage 22.

The fluid channel 24 may be formed by partition panel 36 having a longitudinal length equal to the longitudinal length of the filling chamber 12 and a transverse width less than the transverse width of the filling chamber 12. The partition panel 36 may be latitudinally secured above a floor wall 38 of the filling chamber 12 thereby forming a fluid conduction path between the floor wall 38 and the partition panel 36 and opposing end walls 21 and 23.

Figure 2:
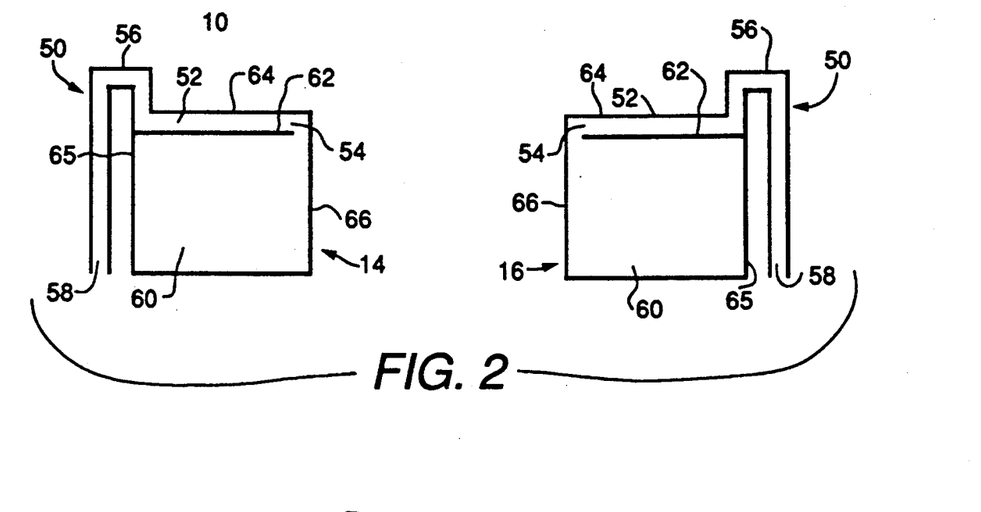
FIG. 2 depicts a cross-sectional view of the tank of FIG. 1 taken along line 2—2.

It will be recognized by those skilled in the art that the filling chamber may be formed in any suitable shape and that the fluid passages and fluid channel may be formed to any suitable cross sectional shape and/or cross sectional areas depending on the particular application. Similarly, the fluid channel may be formed in any suitable manner and may be any suitable size or shape. For example, the partition panel 36 may be formed to extend the entire transverse width of the channel. Holes may then be drilled at distal ends through the panel to form the fluid channel orifice. It will also be recognized that the connecting section of the fluid channel 24 between the compartments would be unnecessary where multiple compartments shared side walls. For example where compartment 14 and compartment 16 shared a wall W. Furthermore, an alternative embodiment may include the filling chamber 12 and corresponding fluid channel 24 extending laterally beyond the surface of the side walls of the compartments 14 and 16. Referring to FIGS. 1 and 2, the tank 10 also includes pressure equalizing vents 50 for each compartment 14 and 16. The vents 50 have an internal channel portion 52 with an opening 54 at one end, and an elbow such as an inverted "U"-shaped continuous channel portion 56 terminated by an opening 58 at another end. The internally located channel portion 52 may be positioned transversely and proximate an internal upper longitudinally distal end portion 60 of the compartments 14 and 16 with the elbow portion protruding out of the compartments 14 and 16 to connect with outside air through the opening 58.

The internal channel portion 52 may be formed by a vent tube 62 latitudinally disposed below a top cover plate 64 of the compartments. The length of vent tube 62 may extend less than the transverse width of the compartments and may extend from a side wall 65 of the compartments toward an opposing side wall 66 of the compartments. Although the pressure equalizing vent 50 may be formed by a piece of square tubing extending from walls of the compartments, it will be recognized that any suitable channel forming device may also be used.

Figure 3:
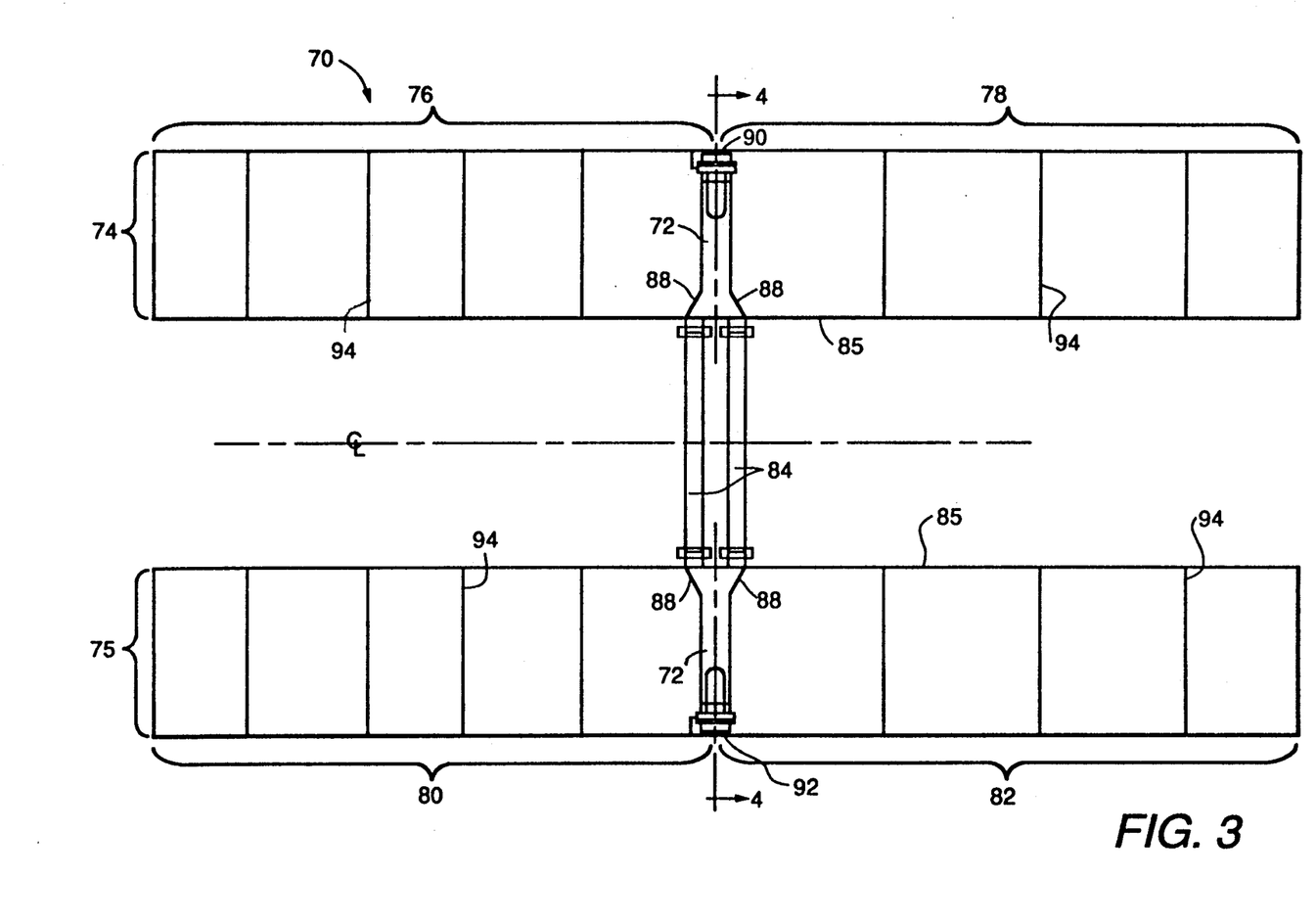
FIG. 3 generally depicts a top view of another embodiment of a compartmentalized tank, without a top cover plate, adapted to be centered about a vehicle center line $C_1$.

FIG. 3 shows a tank 70, such as a locomotive fuel tank, with the compartment top cover plates removed. The tank 70 includes a filling chamber 72, a first set 74 of two left compartments 76 and 78, and a second set 75 of two right compartments 80 and 82 distributed about a center axis $C_1$ such as the longitudinal center axis of a locomotive.

The filling chamber 72 is substantially similar in design to the filling chamber 24 of FIG. 1, but uses a connecting section 84 made of pipes to allow the sets of compartments 74 and 75 to be located at suitable areas in the locomotive. Similarly, the filling chamber 72 uses passages 88 similar to the passages 20, 22, 26, and 28 described with reference to FIG. 1. Portions of end walls 21 and 23 are angled to allow proper connection of the connection pipes 84 (shown in FIG. 3) between left and right sets of compartments 74 and 75. Dual fill ports 90 and 92 are also arranged in the filling chamber 72 in a similar manner as the filling port 18 described with reference to FIG. 1. However, dual fill ports 90 and 92 allow the tank 70 to be filled from either the left or right side of the locomotive. Each compartment 76, 78, 80, and 82 includes a plurality of upright baffles 94 for preventing "sloshing" and providing additional structural support as known in the art.

Figure 4:
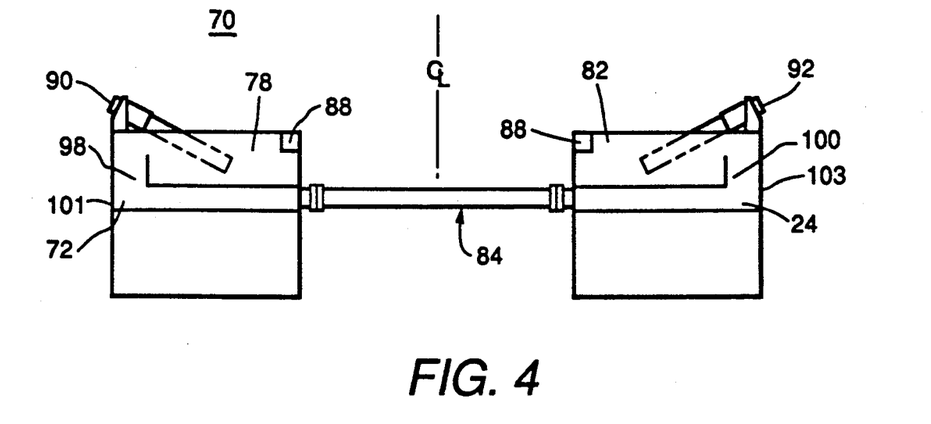
FIG. 4 depicts a cross-sectional view of the tank of FIG. 3 taken along line 4—4.

FIG. 4 illustrates a cross-sectional view of the left side compartment 78, right side compartment 82 and filling chamber 72 shown in FIG. 3. Fluid channel orifices 98 and 100, similar to fluid channel orifices 32 and 34 of FIG. 1, are shown proximate side walls 101 and 103, respectively.

Figure 5:
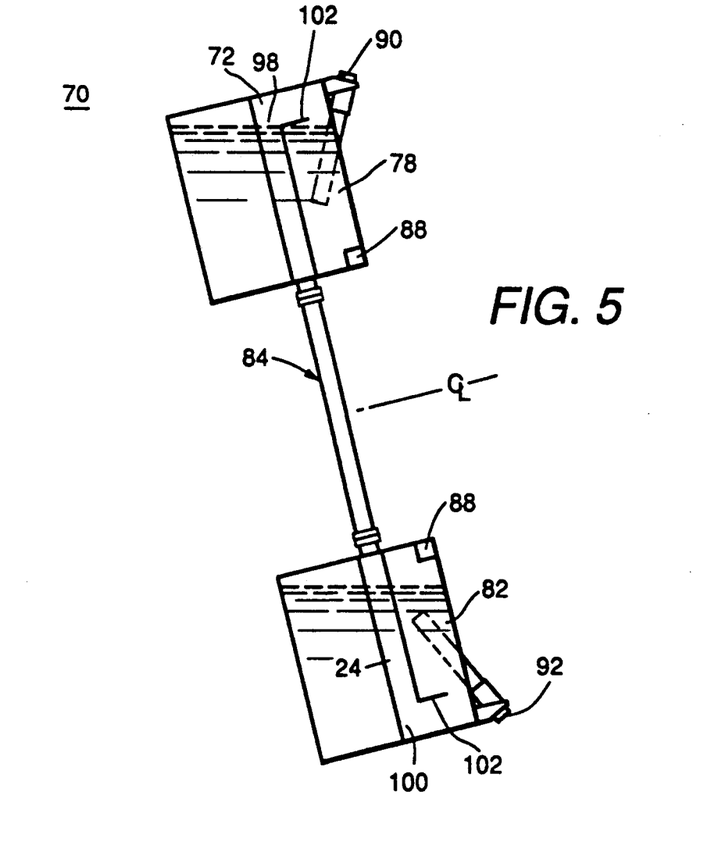
FIG. 5 depicts the tank of FIG. 4 oriented on its right side and shows a fluid restrictive extending upright wall coupled to the distal end of the fluid channel.
Figure 6:
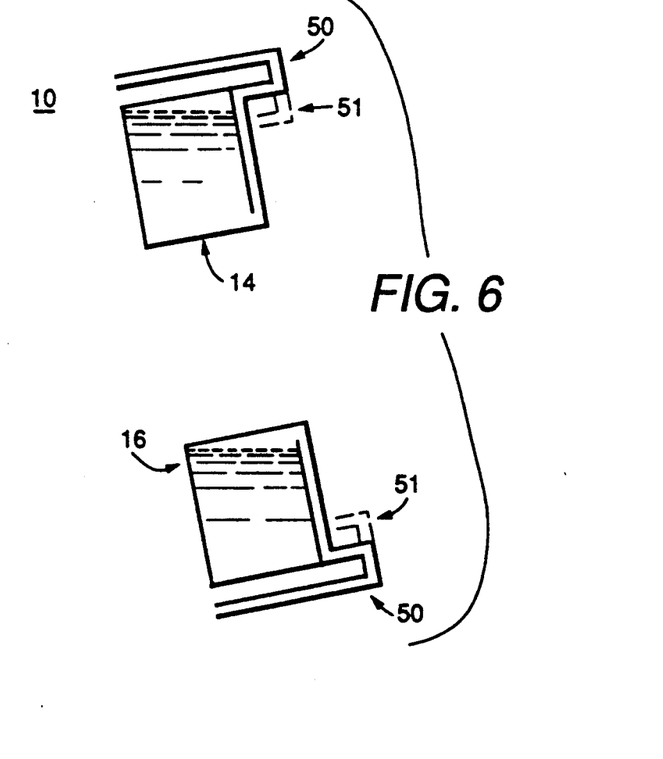
FIG. 6 depicts the tank of FIG. 1 oriented on its right side.

FIGS. 5 and 6 will be used to explain the operation of the inventive compartmentalized tank of FIG. 3, however the description applies equally well to the tank of FIG. 1. Generally, when the tank 70 or tank 10 is in proper orientation such as horizontally level, the fluid channel 24 facilitates fluid flow between the left and right set of compartments 74 and 75 (seen in FIG. 3) when the tank is being filled and substantially prevents fluid flow between the sets of compartments 74 and 75 when the fluid tank 70 is improperly oriented. The fluid loss minimization feature will be discussed in detail later.

FIG. 5 also shows an upright extending Wall section 102 which may be added to the terminal end portion of the partition panel proximate orifices 98 and 100 to add further fluid flow resistance and effectuate a more accurate simultaneous filling of the compartments 76, 78, 80 and 82. For example, if the distal end of the upright extending wall extends to a position substantially level with the bottom of the fluid passages 88, fluid will not be able to flow directly into the fluid channel 24. Instead, a reservoir formed by the upright section and a side wall portion below the fluid passages 88, must be filled before fluid will simultaneously flow over both the extending wall and through the fluid passages 88. As evident from the above description, the invention applies to tanks divided into two or more compartments, the greater the number of compartments, the smaller the amount of fluid which will be lost in the event of localized tank damage due to an accident.

Referring to FIG. 3, for convenience it is desirable to make provisions for filling the tanks from either side of the locomotive, and to have all four compartments 76, 78, 80 and 82 fill at the same time. Part of this invention is the unique provisions made to allow filling of all compartments simultaneously, without the fill system providing a means of fluid draining from all compartments in the event of damage to one of the compartments.

The filling chamber 72 in conjunction with a separating wall (not shown) located below the filling chamber 72 divides each of the two sets of left and right compartments 74 and 75 into two compartments 76, 78, 80 and 82, respectively. In operation, the fluid is pumped into the filling chamber 72 through either or both of the fill ports 90 and 92. Therefore, the fill ports on either side of the tanks can be used to fill all four compartments simultaneously.

Since the fluid channel 24 fluidly couples to the right and left set of compartments 74 and 75, and each set of compartments 74 and 75 is provided with two fluid passages 88, located as shown in FIG. 3, the fluid level in the filling chamber 72 will rise until it reaches the bottom of the fluid passages 88 (fill holes). At this time, it will spill over into the compartments 76, 78, 80, and 82 on either side of the filling chamber 72. The result is that all tank compartments will be filled simultaneously, from a single fill point. With the fluid passages 88 located proximate the very top of the filling chamber 72, damage to any tank compartment will not result in fluid transferring from one compartment to the next. The fluid passages 88 are located not only at the top of the compartment and filling chamber 72 sides, but also on the innermost point possible on the longitudinal inner wall 85 to the vehicle centerline.

Consequently, in the event the vehicle tips on its right side (shown in FIG. 5), and one of the right side compartments 80 or 82 is damaged, the fluid passages 88 on the right side compartments will now be oriented at the top of the compartments. The fluid passages 88 on the right side of the filling chamber 72 will be at the top of the right side tank compartments 80 and 82, thus minimizing flow between the two right side compartments in the event only one is damaged.

A purpose of the fluid channel 24 can be seen by looking at FIGS. 1, 3, and 5 and the filling chamber portion in the set of left compartments 74. The fluid channel 24 prevents fuel from the set of left tank compartments from draining through the connection pipe 84 into the possibly damaged right tank compartments.

A concept similar to the above is used on the compartment pressure equalizers 50 (breathers) to prevent fluid from draining out of the compartments in the event the vehicle ends up on one of its sides. Although not shown in FIG. 3, each compartment must be fitted with a pressure equalizer 50 to allow air to exit and enter as the compartments are filled and emptied.

Referring back to FIG. 2, it can be seen that the internal channel of the pressure equalizers 50 runs from near the vehicle centerline in an opposing direction toward a side wall of the compartment. Relatedly, FIG. 6 shows that in the event the vehicle is on its side, fluid will not have a means of escape through the pressure equalizers 50.

Figure 7:
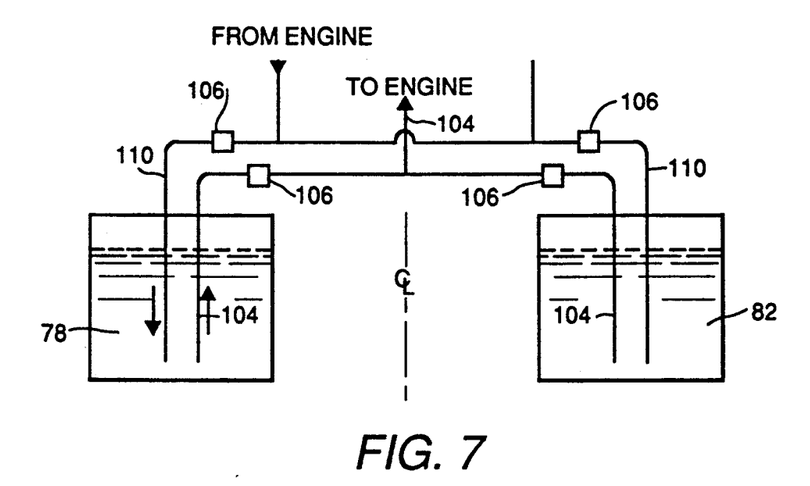
FIG. 7 depicts a cross-sectional view of the fluid compartments with supply lines, return lines and valves in the supply and return lines for each of the compartments in accordance with the invention.
Figure 8:
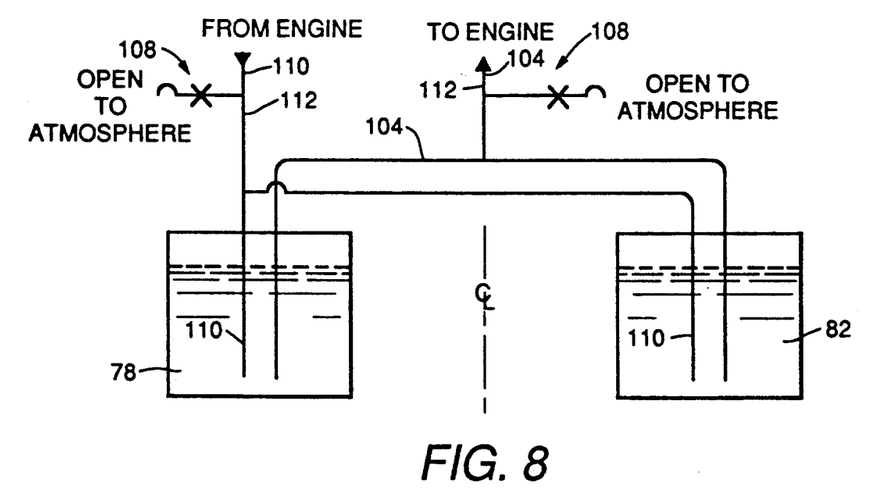
FIG. 8 depicts another embodiment of supply lines and return lines sharing a valve in accordance with the invention.

FIGS. 7 and 8 show several ways to connect supply lines to the various compartments for supplying fluid to a fluid employing device, such as a locomotive engine. A supply line 104 such as a pipe, extends to the bottom of each compartment. The supply lines 104 from all compartments would be connected together, with a valve 106 in each line. In a similar fashion, return lines 110 extend to each compartment and have a valve 106 in each line. The valves 106 prevent fluid from improper siphoning from one compartment to the next, which, in the event of a damaged compartment, would otherwise have resulted in all of the fuel siphoning out into the damaged tank. Although not shown, the valves 106 may be inside the compartments along with a portion of or entire return or supply line. The Valves 106 may be any suitable valve, such as a unidirectional check valve, a bidirectional valve, or a remotely controllable valve.

FIG. 8 shows another embodiment employing a solenoid valve 108 which would be opened to break the vacuum in the lines to prevent siphoning between compartments. The solenoid valve 108 could be triggered when the engine shuts down, or by some other means of detection of an accident. Only one valve 108 is used with the main feed line 112 instead of in the individual lines.

Figure 9:
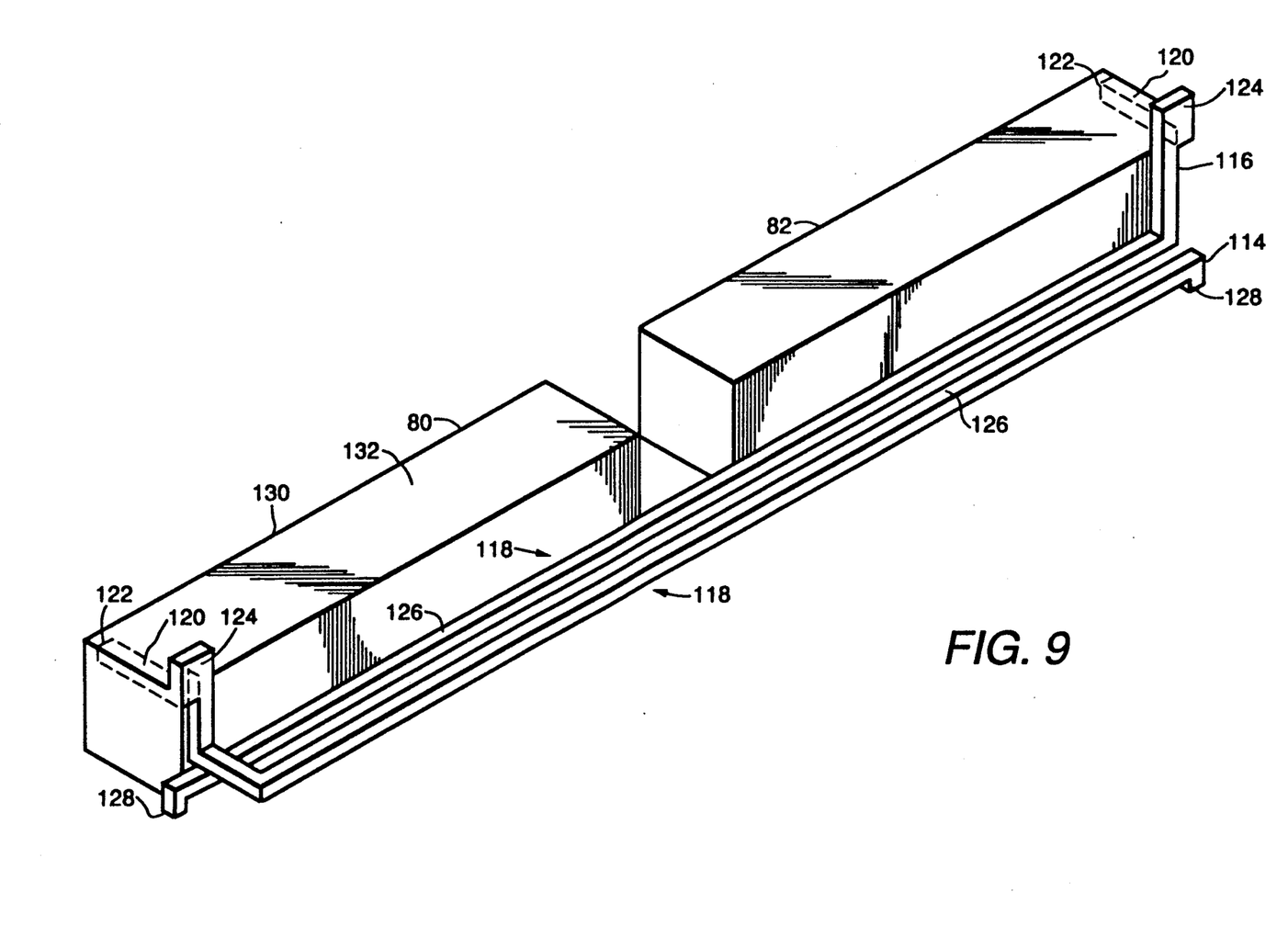
FIG. 9 depicts another embodiment of the pressure equalizer shown in FIGS. 1, 2, and 6.

FIG. 9 shows a pair of pressure equalization vents 114 and 116 coupled to two compartments such as compartments 14 and 16 of FIG. 1 or compartments 76, 78, 80, and 82 (all shown without supply lines and return lines) of FIG. 3. The vents 114 and 116 are identical to the pressure equalizing vents 50 previously described with reference to FIG. 2 with respect to minimizing fluid loss when the compartments are oriented on their sides. However, the vents 114 and 116 include an additional channel section for also minimizing fluid loss when the compartments are oriented on their ends.

Each vent 114 and 116 includes a continuous channel 118 made up of interconnected sections. The sections include a laterally extending section 120 terminated with an opening 122 at one end, an elbow section 124, and a longitudinally extending section 126 terminated with another opening 128. The elbow section 124, such as an inverted "U", section is interposed between the laterally extending section 120 and the longitudinally extending section 126. A portion of the elbow section 124 extends in a generally latitudinal direction to meet the longitudinal section 126.

The laterally extending section 120 is positioned in the compartment is the same manner as described with reference to the vents 50 of FIG. 2. Consequently, the opening 122 in communication with the inside of the compartment, is located proximate a side wall 130. The laterally extending portion has a length less than the lateral width of the compartments and is preferably positioned at a distal end of the compartments and adjacent a top or ceiling wall 132. The laterally extending section extends away from the side wall 130.

The longitudinally extending section 126 extends away from the laterally extending section 120. The longitudinally extending section 126 has a length approximately equal to the longitudinal length of the combined compartments. As shown, the length is slightly greater than the longitudinal length thereby insuring no fluid loss since the opening 128 is above the highest level of the compartment.

Although the longitudinally extending section 126 is shown as being external to the compartment, however, it may be located internal to the compartment with the opening 128 allowed to communicate with air where desirable. It will be recognized that the entire channel 118 may be located internal to the tank as long as the opening 128 can communicate with air external to the tank. Thus the pressure equalizing vents 50 of FIG. 1 may also be located completely inside the compartments if the opening 58 can communicate with air.

In operation, when the compartments 80 and 82 are tipped on their ends, little if any fluid above will drain out since unlike the opening 54 in FIG. 6, the opening 128 is higher than the maximum fluid level of the compartment. Therefore, fluid loss due to improper orientation either in a sideways manner or in an end over end manner will be minimized.

Specific embodiments of novel methods and apparatus for compartmentalized tanks has been described for the purposes of illustrating the manner in which the invention may be used and made. It should be understood that the implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A compartmentalized fluid tank device comprising:
    first fluid containment means,
    second fluid containment means, and
    filling chamber means, in fluid connection with said first and second fluid containment means, for filling said first and second containment means, said filling chamber means having a filling port and fluid channel means for facilitating fluid flow between said first and second containment means when the tank is being filled, and for substantially preventing fluid flow between said first and second containment means when said tank is improperly oriented, said fluid channel means in the filling chamber being defined by end walls connected to a floor wall, and a partition panel secured above the floor wall.

2. The device of claim 1 wherein said filling chamber lies above at least a portion of said first and second fluid containment means.

3. The device of claim 1 further comprising pressure equalizing means in each of said first and second containment means, said pressure equalizing means having,
    a channel for conducting air flow into and out of said containment means, the channel having
    a first channel portion having one end thereof positioned internal said containment means, and
    an elbow portion having a second end in communication with air.

4. The device of claim 3, wherein said pressure equalizing means is positioned proximate an internal upper distal longitudinal end portion of said first and second containment means.

5. The device of claim 1 wherein said fluid channel has a longitudinal length extending the longitudinal length of said filling chamber and a transverse width extending less than the transverse width of said filling chamber.

6. The device of claim 1 wherein said filling channel means in the filling chamber being defined by end was chamber comprises multiple fill ports for receiving fluid from a fluid source.

* * * * *